(12) United States Patent
Brok den et al.

(10) Patent No.: US 8,725,107 B2
(45) Date of Patent: May 13, 2014

(54) METHOD FOR SENDING EMERGENCY MESSAGES TO MOBILE TERMINALS

(75) Inventors: Antoine Brok den, Rijen (NL); Johannes Jan Bot, Nieuwendijk (NL)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 0 days.

(21) Appl. No.: 13/128,425

(22) PCT Filed: Nov. 11, 2008

(86) PCT No.: PCT/EP2008/065320
§ 371 (c)(1),
(2), (4) Date: May 10, 2011

(87) PCT Pub. No.: WO2010/054681
PCT Pub. Date: May 20, 2010

(65) Prior Publication Data
US 2011/0223881 A1    Sep. 15, 2011

(51) Int. Cl.
*H04M 11/04*    (2006.01)
(52) U.S. Cl.
USPC ............ 455/404; 455/433; 455/558; 455/432
(58) Field of Classification Search
USPC ......... 709/206–207; 455/404.1, 404.4, 432.3, 455/433, 558
See application file for complete search history.

(56) References Cited

U.S. PATENT DOCUMENTS

| | | | |
|---|---|---|---|
| 2004/0103158 A1* | 5/2004 | Vella et al. | 709/206 |
| 2004/0219908 A1* | 11/2004 | Ganor | 455/422.1 |
| 2005/0002407 A1* | 1/2005 | Shaheen et al. | 370/401 |
| 2006/0223492 A1* | 10/2006 | Chin et al. | 455/404.1 |
| 2006/0234672 A1 | 10/2006 | Adler | |
| 2007/0202927 A1* | 8/2007 | Pfleging et al. | 455/567 |
| 2008/0207181 A1* | 8/2008 | Jiang | 455/414.1 |
| 2008/0293408 A1* | 11/2008 | Jiang | 455/433 |
| 2009/0111440 A1* | 4/2009 | Rizzi | 455/414.4 |
| 2009/0137222 A1* | 5/2009 | Heen | 455/404.1 |
| 2009/0325538 A1* | 12/2009 | Sennett et al. | 455/404.2 |

FOREIGN PATENT DOCUMENTS

WO    WO 2007 116260 A    10/2007

OTHER PUBLICATIONS

3GPP TS 29.002 V8.7.0, 3GPP MAP Specification (Sep. 2008).*

* cited by examiner

*Primary Examiner* — David Q Nguyen

(57) ABSTRACT

The invention relates to a method for sending an emergency message to mobile terminals located in an emergency area, in which at least location information and a subscriber identification code is stored in a database for a plurality of mobile terminals. Then the emergency area is determined. Next, a set of destination terminals is selected out of the database having location information that corresponds to the emergency area. To each of the destination terminals the emergency message is sent by means of an SMS message or a voice message using said subscriber identification code. By using the method according to the invention, all the terminals present in the emergency area can be reached, independent of whether they are subscribed to an SMS alerting service, and not depending on a certain channel to receive the message.

15 Claims, 9 Drawing Sheets

| Allocation | | | | | | Response expected | | | |
|---|---|---|---|---|---|---|---|---|---|
| IMSI | IMEI | MSISDN | HLR ID | VMSC ID | location | Mesg. ID | Seq. Nr | Orig. ID | Recip. ID |
| | | | | | | | | | |
| | | | | | | | | | |
| | | | | | | | | | |
| | | | | | | | | | |
| | | | | | | | | | |
| | | | | | | | | | |

| Mesg. ID | Arg/Resp | Routine |
|---|---|---|
| | | |
| | | |
| | | |

METHOD FOR SENDING EMERGENCY MESSAGES TO MOBILE TERMINALS

TECHNICAL FIELD

The present invention relates to a method for sending an emergency message to mobile terminals located in an emergency area. The invention also relates to a telecommunication network and network elements on which the method can be implemented.

BACKGROUND

Nowadays, in case of an emergency a government is able to send a free text alert message, broadcasted via a Cell Broadcast messaging function of a telecommunication network. Often a special emergency centre is in charge of sending the emergency message. This emergency centre selects all base stations of one or more mobile telecommunication networks in the emergency area, assembles an emergency message, and broadcasts the message via all the selected base stations. The message is received by mobile terminals registered with those base stations. However, at present not all operators have the Cell Broadcast messaging function activated in their network yet, and furthermore many handsets do not have the capability to support cell broadcast. As a result, a lot of mobile terminals will not be reached, even if they are powered on.

SUMMARY OF THE INVENTION

It is a goal of the present invention to be able to warn more mobile terminal subscribers in case of an emergency than is possible using state of the art methods.

This goal is achieved by a method for sending an emergency message to mobile terminals located in an emergency area, in which at least location information and a subscriber identification code is stored in a database for a plurality of mobile terminals. Then the emergency area is determined. Next, a set of destination terminals is selected out of the database having location information that corresponds to the emergency area. To each of the destination terminals the emergency message is sent by means of an SMS message or a voice message using said subscriber identification code. By using the method according to the invention, all the terminals present in the emergency area can be reached, independent of whether they are subscribed to an SMS alerting service, and not depending on a certain channel to receive the message.

The invention also relates to a mobile telecommunication network comprising:
- a first network element arranged to store at least location information and a subscriber identification code in a database for a plurality of mobile terminals;
- a second network element arranged to determine said emergency area;
- a third network element arranged to select a set of destination terminals out of said database having location information that corresponds to said emergency area;
- a fourth network element arranged to send each of said destination terminals an emergency message by means of an SMS message or a voice message using said subscriber identification code.

The definition of the emergency area can be done in an application running on the second network element, such as an SCP, or it can be determined at an emergency centre connected to the application. An emergency area can be defined by e.g. a set of geographic coordinates defining a polygon, a circle with geographic centre and radius, etcetera.

The invention further relates to a mobile telecommunication network element arranged to receive terminal location update messages, extract location information and subscriber identification codes out of the messages, and store the location information and the subscriber identification codes for a plurality of mobile terminals in a database. Such an element may be an SCP or an STP, or any other suitable network element.

BRIEF DESCRIPTION OF THE DRAWINGS

The present invention will be discussed in more detail below, using a number of exemplary embodiments, with reference to the attached drawings, in which:

FIG. 5A shows an example of an allocation table maintained by an STP;

FIG. 5B shows an example of a message ID table;

DETAILED DESCRIPTION OF EXEMPLARY EMBODIMENTS

Figure 1:
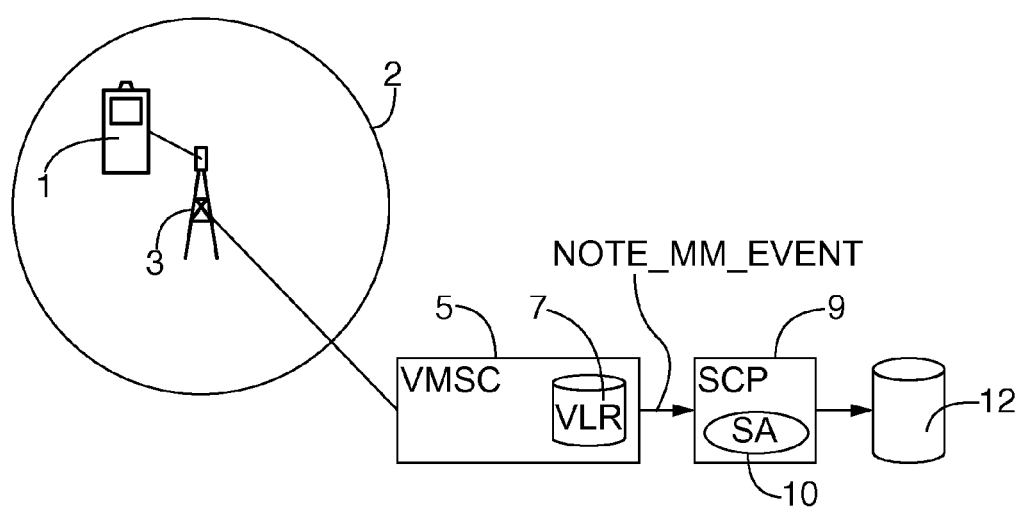
FIG. 1 schematically shows a part of a telecommunication network in which the method according to the invention may be implemented.

FIG. 1 schematically shows a part of a telecommunication network in which the method according to the invention may be implemented. According to an embodiment, the telecommunication network comprises a GSM network. Alternatively, the network comprises a UMTS network. FIG. 1 shows a mobile terminal 1 which is located in a coverage area 2 of a base station 3 of a GSM network. The coverage area 2 is also referred to as cell 2. The base station 3 is in communication with a VMSC 5 comprising a VLR 7. The VMSC 5 is in communication with a SCP 9 on which an IN application 10 is running. In this case the SCP 9 is also referred to a gsmSCP 9. The IN application 10 is using a database 12 to store and/or retrieve information.

The location of the mobile terminal 1 will constantly be updated and stored into the GSM network. Updates will occur during a periodic location update, when making or receiving a call, when sending or receiving an SMS, or when switching on or off the mobile terminal. The VLR 7 is a state of the art VLR and it will send a MAPv3 Note MM event to the gsmSCP 9. That notification is defined in 3GPP TS 29.002 for R99 as a MAP Operation ("NoteMM-Event"). A NoteMMEvent contains the following information:
IMSI code;
LocationInformation;
MSISDN, wherein the LocationInformation field comprises the following parameters:
  CellGlobalIdOrServiceAreaIdOrLai;
  GeodeticInformation;
  GeographicalInformation;
  LocationNumber;
  IsdnAddressString;
  AgeOfLocationInformation.

According to an embodiment, based on Note MM event, the IN application 10 will extract subscriber information and corresponding location information from the Note MM event and will store this information into the database 12 for a plurality of terminals. For this reason, the IN application 10 is also referred to the Storing Application (SA) 10. The subscriber information may comprise the IMSI and/or the MSISDN for a specific mobile terminal.

In an embodiment, an entry in the database comprises:
  a CellID of the cell in which the terminal is located (i.e. registered);
  an IMSI code of the terminal;
  an MSISDN code of the terminal.

The database 12 may be a central database accessible for multiple Storing applications 10 running on SCPs serviced by different telecommunication providers. In this way, one single database will comprise location information of mobile terminals of different providers. This will increase the number of terminals that can be alerted using the method according to the invention.

Figure 2:
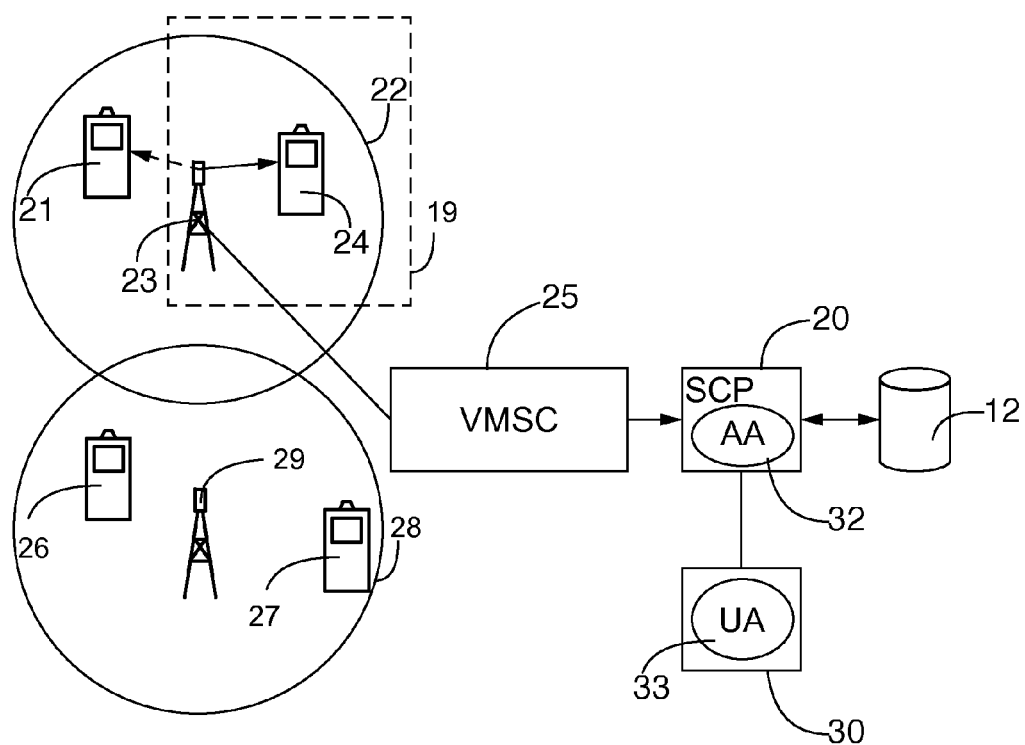
FIG. 2 schematically shows part of a telecommunication network according to an embodiment.

According to an embodiment of the invention, the information stored in the database 12 is used to send an emergency message towards the subscribers (i.e. mobile terminals) within a certain area 19. This is explained in more detail with reference to FIG. 2. FIG. 2 schematically shows part of a telecommunication network comprising the database 12 of FIG. 1 and an SCP 20 according to an embodiment. In FIG. 2, two mobile terminals 21,24 are in a cell 22 of a first base station 23 which is arranged to communicate to the network via a VMSC 25. Furthermore, two mobile terminals 26,27 are located in a cell 28 of a second base station 29. FIG. 2 also shows a communication device 30, such as a computer, which is arranged to communicate via an IP protocol to an Alerting application (AA) 32 running on the SCP 20. In an embodiment, the Alerting application is arranged to cooperate with a GUI 33 executed on the communication device 30. The communication device 30 may be a computer, or computer system, of an emergency centre. Such an emergency centre will be alarmed in case of an emergency. At the emergency centre, a decision is taken whether to alert people in an area around the emergency, such as in case of a fire at a chemical factory. Next, an emergency area 19 (see FIG. 2) is defined and entered into the Alerting application 32 using the GUI application 33. The emergency centre mentioned above, may be a centre for warning all people in a so-called 'Administrative area', such as a country or a province.

In an embodiment, the Alerting application 32 is arranged to translate metrics of the emergency area 19 into CellIDs of cells that at least partly overlap the emergency area 19. In the very simple example of FIG. 2, cell 22 overlaps the emergency area 19. The cell 28 does not. Next, the Alerting application 32 will access the database 12 to find all terminals with a cellID of cell 22. In this case the terminals 21 and 24 will be found in the database 12 and will be regarded as so-called destination terminals. Next, the Alerting application 32 will send each of the destination terminals 21, 24 a determined emergency message by means of an SMS message or a voice message using the subscriber identification codes of the destination terminals 21,24. The emergency message could be defined at the emergency centre but it could also be (pre) defined by the Alerting application 32 on the SCP 20, or at any other network node of the telecommunication network, as will be appreciated by the skilled person. An advantage of sending an SMS message as compared to standard paging is that SMS allows users to directly transmit messages to each other without the use of an operator. It is, however, necessary to have the underlying operator controlled wireless service. The Alerting application 32 can send a message to a number of mobile terminals, via a direct connect computer. The SMS protocol of messaging is also "smarter" then standard paging. SMS is a store and forward method therefore, if the users of the destination terminals 21,24 are not available, the destination terminals 21,24 are powered off, or the terminals are outside a service area, when the terminals 21, 24 come back on-line, the emergency message will appear on the display of the terminals 21,24. In an embodiment, the SMS message is sent "certified" so that it will notify the message originator (e.g. the emergency centre) of the end user's receipt of the emergency message. In an embodiment, the emergency message is sent using a class 0 SMS message. The class 0 indication ensures that the message is displayed on the destination terminals 21,24 immediately and a message delivery report is sent back to the originator. The message does not have to be saved in the mobile terminals or on a SIM card, unless selected to do so by the mobile user.

Alternatively, a spoken message is sent to the destination terminals 21,24.

It is noted that the SCP 9 of FIG. 1 and the SCP 20 of FIG. 2 can be a single SCP. In that case, the Alerting application 32 and the Storing application (SA) 10 are executed on the same network element.

To provide a more detailed and exact location information, the selection of mobile terminals in the emergency area can be done in three steps. First, the Alerting application 32 selects each mobile terminal that has a CellID associated with a cell at least party overlapping with said emergency area. Next, a dedicated position of the selected mobiles is requested by means of an active location request using a MAP-ATI message. And finally, a set of destination terminals is determined based on the location information received from the terminals. In this way the number of mobile terminals that will get the message is limited to those that are really located in the emergency area at the given time. In the situation of FIG. 2 only terminal 24 will receive a message. This embodiment will further avoid unnecessary panic and overreaction of the public, while reaching as many relevant terminals as possible.

In an embodiment, the emergency message is written or spoken in a user specific language. The language can be determined using for example the country code (CC) contained in the IMSI code. Once, all destination terminals are selected, the emergency message is translated into a language related to the CC. Then, the translated messages will be sent to the destination terminals. Additionally, the Alerting application 32 can provide CC groupings in situations where is known that these CC's have a common language. Furthermore the Alerting application 32 may provide an indication of the language belonging or most appropriate for that CC or group of CC's.

When the user of a mobile terminal inserts his SIM card and switches on the mobile terminal, the mobile terminal will identify available PLMNs and based on some ruling on the SIM card in co-operation with the networks, one specific PLMN is selected to attach to. As will be known by the skilled person, this attachment is initiated by a DTAP-Attach message from the mobile terminal to an MSC. A PLMN may have multiple MSCs each covering a specific part of the total coverage area of the PLMN or having overlapping coverage areas. The receiving MSC is responsible for all mobile terminals connected to the PLMN in that specific part. The MSC receives the DTAP-Attach which contains the IMSI as stored on the SIM card. The MSC then acts with sending a MAP_LOCATION_UPDATE message to a HLR (being the own network HLR for a home subscriber or another network HLR for a visiting subscriber as being indicated by the country and network code of the IMSI). The HLR receiving the message will register the location area with the subscription having the corresponding IMSI together with the MSC to address. Where IMSI and MSISDN are static parts of the subscription, the location area and the MSC to be addressed are dynamic. The HLR acknowledges the message with a response back to the MSC which includes the MSISDN as contained in the subscription.

When a subscriber is addressed (like setting up a call towards him), the call will initially be set-up to a Gateway MSC (GMSC) in the Home PLMN of that subscriber. The GMSC will interrogate the HLR to find the actual MSC the subscriber is currently connected to. This MSC is commonly noted as Visiting MSC (VMSC), see e.g. VMSC 5 in FIG. 1, also when it is a MSC in the Home PLMN. The GMSC will forward the call to that VMSC.

When a subscriber is moving he may leave one coverage area and move into a coverage area of another MSC (may be also in another PLMN). As for switching on, the other MSC will get a DTAP-attach message with the IMSI as stated on the SIM card. Likewise a message is sent to the relevant HLR specifying the location area and the MSC address. The HLR will update the dynamic data with the new values.

When switching off a mobile terminal or when moving out of MSC coverage area this is notified to the MSC by means of a DTAP-Detach message send by the mobile terminal to the MSC, which includes again the IMSI. The MSC does not discard immediately the subscriber's subscription data which the MSC obtained from the HLR and maintains in its internal data store. Instead the MSC sets a timer for this subscription. Reason is that the mobile may be switched on again in short time or may re-enter the coverage area like in border cases. The timer value is a MSC parameter and is commonly set to several hours or a day. When the mobile is switched on again or re-enters the coverage area of the MSC before the timer has expired the timer is cancelled together with sending the MAP_LOCATION_UPDATE message. If however the mobile is not switched on or re-enters the coverage area within the maximum duration of the timer, the timer expires and the MSC sends a MAP_PURGE_MS message to HLR indicating that the local registration of the IMSI/MSISDN is discarded.

When moving out of MSC coverage area it may be that not at the same time the mobile terminal moves into another MSC coverage area (like a non network covered area, e.g. a tunnel). Therefore the MSC also sends a MAP_CANCEL_LOCATION message to the HLR indicating that the location area is no longer valid. This message is not subject to a timer as the MAP_PURGE_MS.

Figure 3:
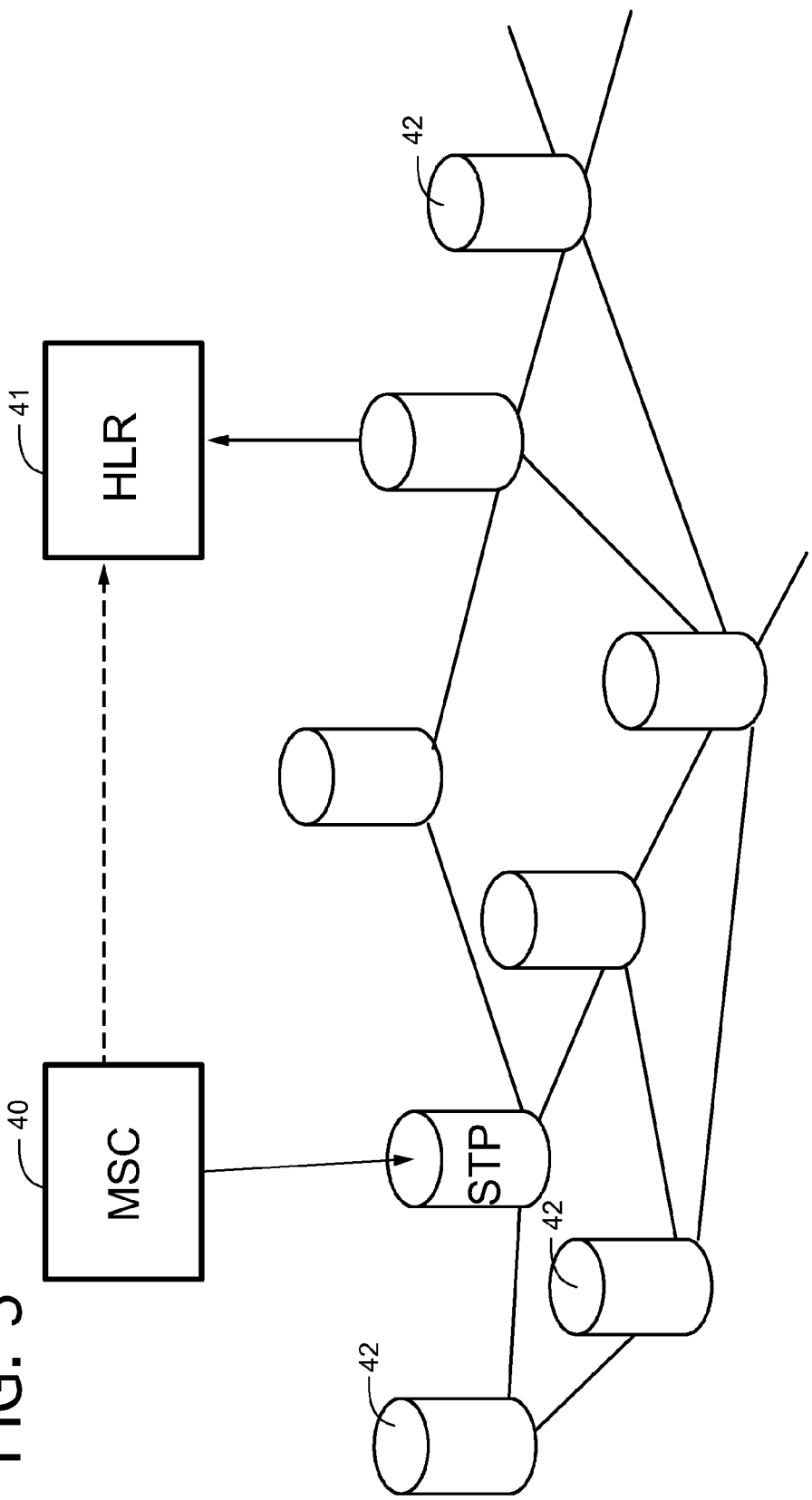
FIG. 3 shows an MSC and a HLR which communicate by means of SS7 messages over a SS7 link according to the state of the art.

FIG. 3 shows an MSC 40 and a HLR 41 which communicate by means of SS7 messages over a SS7 link according to the state of the art. They do not address each other directly. Message transport is facilitated by Signal Transfer Points (STP) 42 performing the message routing in the SS7 network. The entities like MSC and HLR, also denoted as signaling end points (SEP), send outgoing SS7 messages to their closest STP. The SS7 network, comprising the STPs 42 as routing nodes interconnected by SS7 links, is underlying to all modern telecommunication networks and allows a SEP in one network to send messages to a SEP in another network. Although the STP's main function is routing of messages it may have some additional functionality implemented. Examples are number portability (keeping your mobile number when changing your subscription to another operator) and global title translation (generic address translated into a specific address). The STPs are mostly mated pairs to meet stringent reliability requirements. A STP can also be combined with a SEP where that is appropriate. It shall be noted that none of the messages are actually intended for the STP as recipient. In all cases the message needs to be forwarded to the intended recipient.

Figure 4:
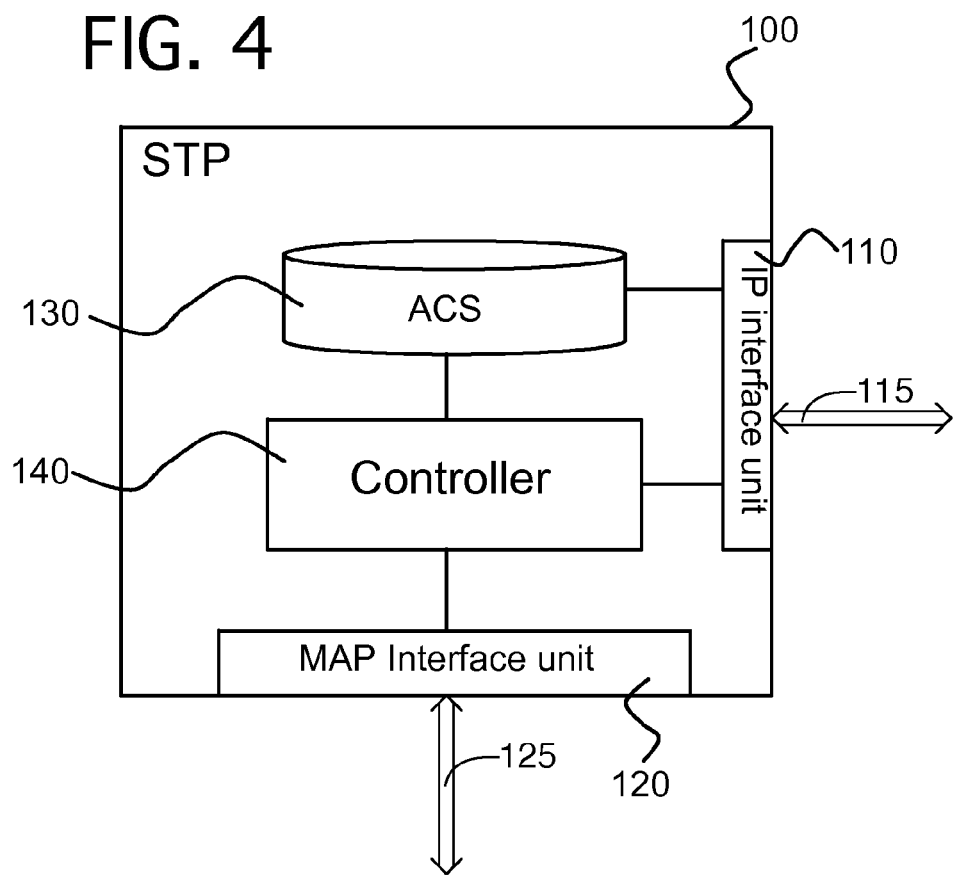
FIG. 4 schematically shows an STP according to an embodiment.

FIG. 4 schematically shows an STP 100 according to an embodiment of the invention. The STP 100 is has state of the art functionality but is further arranged to intercept the SS7 messages mentioned above to fill a database with relevant information on the location of mobile terminals. The STP 100 maintains a table comprising a coupling between an IMSI of a subscription of the mobile terminal with a location of the mobile terminal for a plurality of mobile terminals. It is noted that instead of using IMSI, also MSISDN may be used to couple to the location. In an embodiment, the table contains couplings for all mobile terminals that are marked as switched on and connected in the area covered by MSCs of multiple telecommunication networks service by different providers. It is noted that the subscription of the mobile terminals may be maintained in an HLR of a different network than the one used to locate the terminals.

The STP 100 of FIG. 4 is specially adapted to intercept and store IMSI and location information. The STP 100 comprises the following elements that together provide this capability: a MAP interface unit (MIU) 120, an IP interface unit (IIU) 110, an Allocation store (ACS) 130 and the controller 140. The IIU 110 is a known IP interface for sending and receiving IP packets, see arrow 115. Received IP packets are internally transported to either the controller 140 or the ACS 130 based on identified socket addresses in the IP packages. The MIU 120 is also a known sender and receiver for MAP messages, see arrow 125. Received MAP messages are forwarded to the controller 140 for further analysis and determination of the intended recipient. The controller 140 returns modified MAP messages back to the MIU 120 for further transport to their final destination.

In an embodiment, apart from tables related to the standard operation of the STP 100, like routing tables, the ACS 130 comprises an allocation table 131, see FIG. 5A, where the actual coupling between an IMSI and the location is maintained. The ACS 130 further comprises a message ID table 132, see FIG. 5B, where the coupling between message ID's and routines to be executed for those messages are maintained. The routines to be executed are stored in the ACS 130 as a routine set, each routine having a unique ID.

The allocation table 131 of FIG. 5A comprises two basic sections. The first section is for the actual registration of IMSI-location couplings. The second section identifying that for a specific entry (a coupling) a further action need to be done when a response message is received belonging to the request (argument) message.

In this embodiment, the first section comprises for each entry the IMEI, IMSI, the MSISDN, the location, the global HLR address and the VMSC address. The allocation table 131 has further one consistency rule that each IMEI, IMSI and MSISDN are unique and may appear only once in the table. The second section of each entry is filled when a routine triggered by a received request message requires data from the response message belonging to the request message to complete the coupling entry. In that case the request message routine fills the fields; message ID, sequence number, originator ID and recipient ID for the expected response message before terminating execution. When the corresponding response message is received, the counterpart routine will continue the execution and complete the coupling entry.

FIG. 5B shows a message ID table 132 that holds one entry for each message ID. One entry comprises the message ID, whether it is a request or a response message and the ID of the related routine from the routine set to be executed. The ID table 132 can also be used for the standard operation of the STP.

The STP 100 described above may be implemented in an SS7 network comprising a plurality of such STPs, each having an ACS 130. For the operation of the SS7 network, the ACS'es may be mirrored databases, as will be known to the skilled person. The state of the art mirror mechanism uses the IP interface 110 for exchanging updates made to the ACS 130. This also facilitates maintenance of the system as changes to static data can be made simply to one STP while the mirror mechanism takes care of updating the other ACSs thereby maintaining one consistent distributed database. Although a standard intranet of the SS7 network could be used, a dedicated intranet for just the STPs is preferred which can be coupled by means of a gateway to the network intranet.

Figure 6A:
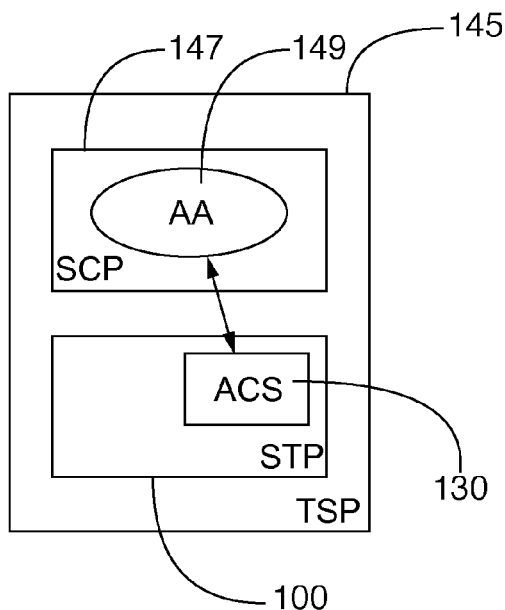
FIG. 6A shows an embodiment of an STP that is implemented on an TSP together with an SCP.
Figure 6B:
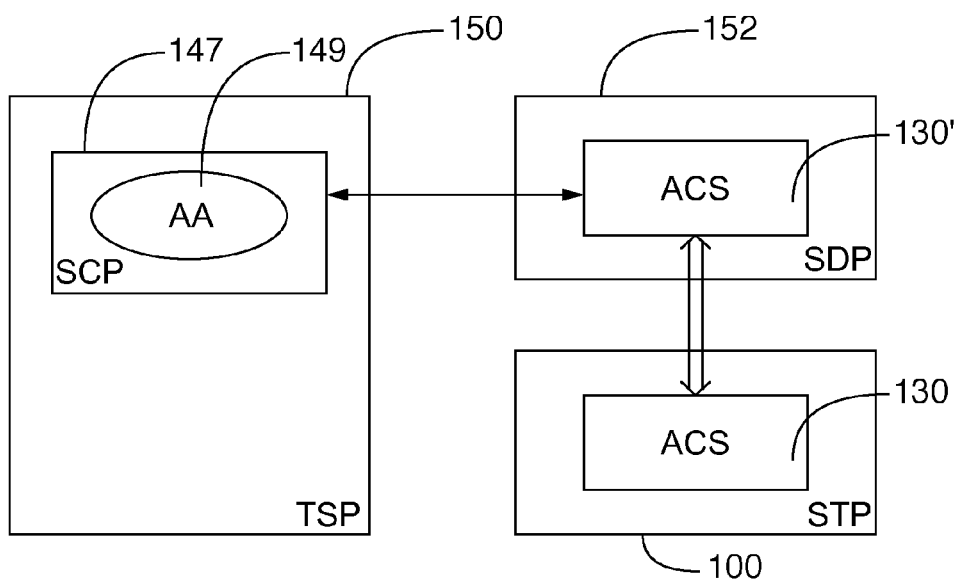
FIG. 6B shows an embodiment of an STP that is implemented on a TSP separate from an SCP.

FIG. 6A shows an embodiment of the STP 100 that is implemented on a TSP 145. On the TSP 145 also an SCP 147 is implemented on which an alerting application 149 runs. Because both the SCP 147 and the STP 100 are present on the same platform 145, the alerting application 149 can directly access an ACS 130 of the STP 100. Alternatively, the SCP 147 is arranged on a platform, see TSP 150, that is different from the platform of the STP 100, see FIG. 6B. Now, the SCP 147 cannot directly access an ACS 130 as there is no defined interface for that. According to an embodiment, the SCP 147 uses a standard interface with a dedicated SDP 152, see FIG. 6B, where the SCP 147 can retrieve data from. Inside the SDP 152 also an ACS 130' is arranged. This ACS 130' is included in the mirroring of the distributed ACS 130 present on the STPs 100. In this way, the alerting application 149 on the SCP 147 can access the database 130.

Figure 7:
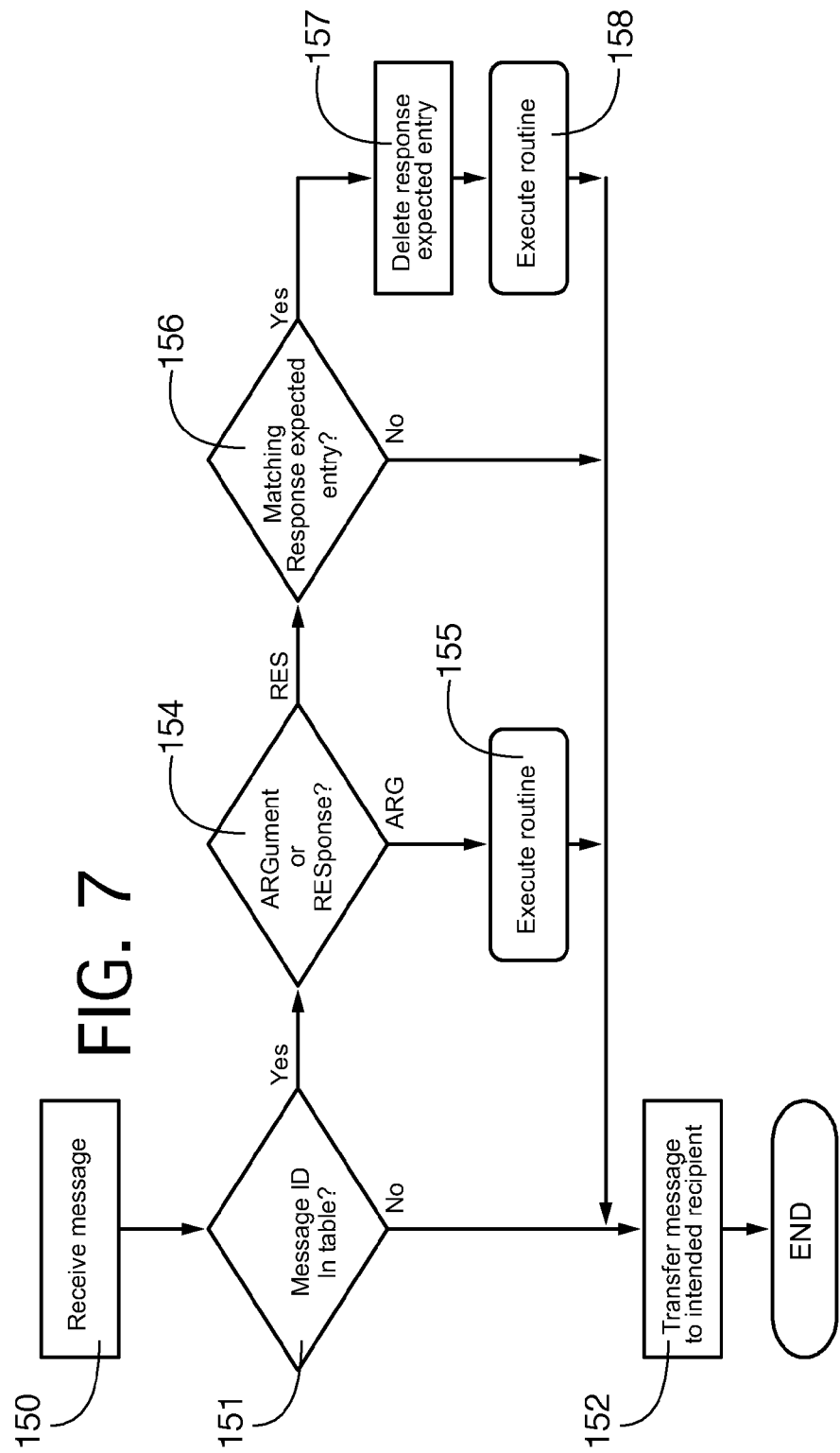
FIG. 7 shows an example of a flow chart of actions performed by the controller of an STP according to an embodiment.

The controller 140 shown in FIG. 4 is the core operator in the STP 100. The controller 140 is driven by messages received by the STP 100. FIG. 7 shows an example of a flow chart of actions performed by the controller 140. When a message is received, see step 150, the controller 140 will check the message ID table 132 in the ACS 130, see step 151. For the purpose of the invention, it is here assumed that only message ID's related to maintaining IMSI-location are maintained in message ID table 132. If the message ID is not in the message ID table 132, then the controller 140 continues with the standard operation of analyzing the message for determining the correct recipient and forwards it to that correct recipient, see step 152. When the message ID is in the message ID table 132, a step 154 follows step 151, and the controller 140 looks to the Argument/Response field of the message ID matching entry. If the message was an argument type message, it will start executing the routine from the routine set in the ACS, identified in the routine field of the message ID matching entry, see step 155. When in step 154 the message is of a response type, a step 156 follows in which the controller 140 checks whether a full match of message ID, sequence number, originating ID and recipient ID can be made to the response expected section of one of the entries in the allocation table 131. In comparing originating ID and recipient ID, the controller 140 takes the aspect of global titles and dedicated ID's into the compare process. If there is no matching expected response, the controller 140 continues with the standard operation for that message, see step 152. If such a match is found, then the controller 140 clears the response expected section of that entry, see step 157, and starts executing the identified routine in the message ID table 132, see step 158. After execution, the controller 140 continues with the standard operation for that message, see step 152.

Now a more detailed description will be given of those routines involved in maintaining the IMSI-location coupling. In principle any message that is received by the STP 100 which contains location information of a terminal as well as a IMSI and/or a MSISDN can be used for maintaining the coupling in a database.

Figure 8:
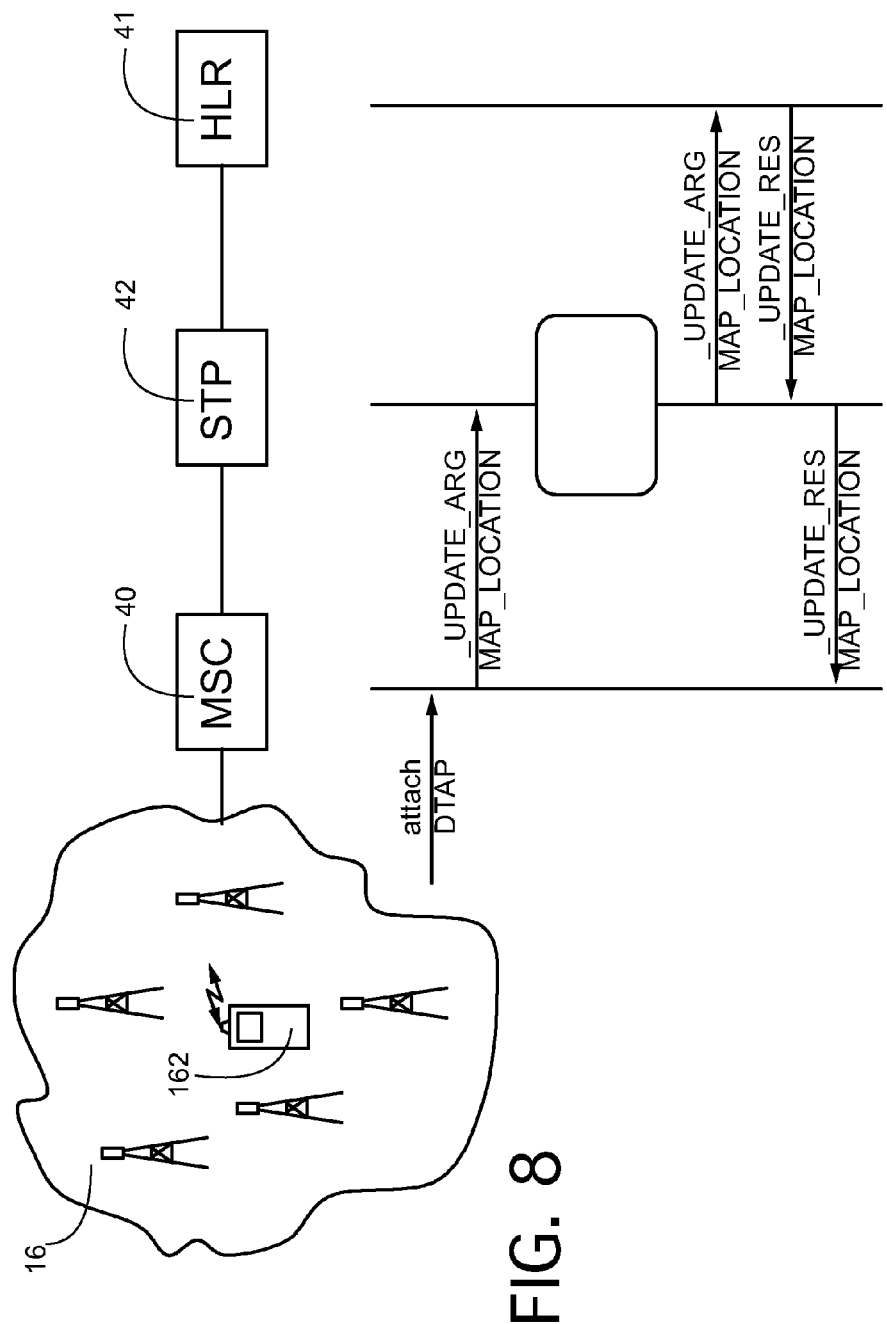
FIG. 8 schematically shows a message sequence diagram according to an embodiment.

Some MAP messages most suited for this purpose will now be discussed with reference to FIG. 8. A suitable moment to start a coupling is when a mobile terminal 162 moves into the coverage area 160 of the network or switches on inside the network. In those cases, as discussed above, an MSC related to the (part of the) network coverage area 160 in question (i.e. MSC 40) will issue a MAP_LOCATION_UPDATE message towards the HLR 41, see FIG. 8, indicating that the MSC 40 needs to be addressed for setting up a call towards the mobile station. The MAP_LOCATION_UPDATE comprises both the IMSI and the locations. The message travels on its route to the HLR 41 through one of the STPs 42 of the SS7 network as outlined in FIG. 8. Entering the STP 42 the message is received by the controller 140 (see FIG. 4) and based on the fact that it has a message ID contained in the message ID table 132 (see FIG. 5B) and that is a request type of message, the controller 140 will start the appropriate routine. The controller 140, executing the routine, creates a new entry in the allocation table 131 and saves the IMEI and IMSI values as retrieved from the message. Also from the message, in this case the message header, the controller 140 retrieves the ISDN address of the HLR 41. Due to the nature of network set-up most commonly this is a global title address of the HLR 41. If the HLR detailed address option is not used then with saving the entry the routine is completed. If the detailed HLR address option is used, then the controller 140 requires completing the response expected section of the entry, before saving the entry. The message ID is the ID of the response type counter part of the MAP_LOCATION_UPDATE, the sequence number is obtained from the current message, the intended recipient address of the current message is stored as the originator address of the response, and the current message originator address as intended recipient address of the response. With saving both sections of the entry the routine is completed.

The ACS 130 mentioned above includes a consistency rule for the allocation table 131. Any attempt to write a new entry which has an IMEI, IMSI or MSISDN already present in the allocation table 131 will lead to a denial of the write action. There are two main reasons why this can happen. First, if a person purchases a new mobile phone he might put his SIM card into the new one. Therefore the phone is switched off and the SIM card removed from the old phone. Unfortunately switching off is only reported by an MSC after a certain time (is a parameter setting of the MSC). In practice this is several hours or more than a day. So when inserting the SIM card in the new phone and switching it on will lead to a MAP_LOCATION_UPDATE message before any report of switching off. A similar situation exists when a person has two SIM cards, one for business and one for Private and having only one phone. A comparable situation is when changing from a post paid SIM card to a prepaid SIM card. Also in these situations the MAP_LOCATION_UPDATE message will arrive at the STP 42 long before a switched off reporting. Safeguard for these situations is that the ACS database 130 refuses dual entry. The controller 140 shall therefore, when the entry is refused, first delete the existing entry having identical IMSI, IMEI or MSISDN before retrying the save operation.

Figure 9:
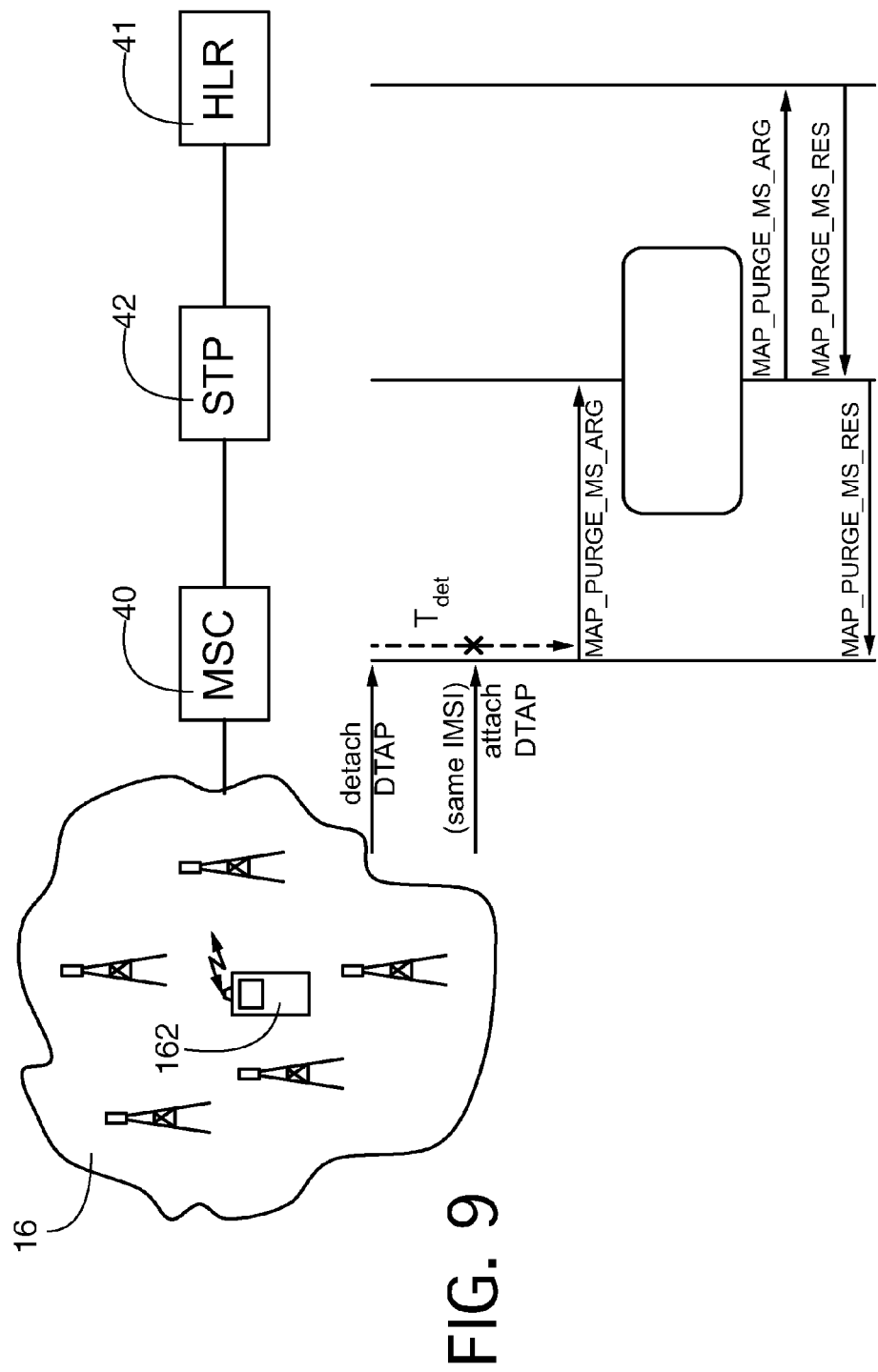
FIG. 9 schematically shows a further message sequence diagram according to an embodiment.

Although the continuous location update will maintain valid coupling, the switching off reporting can be used to remove couplings. For example, if a one time visitor leaves the country and switches of before boarding the plane. As given in FIG. 9, when switching off a DTAP_Detach message is sent to the MSC 40. When the time Tdet is expired, the MSC 40 will send a MAP_PURGE_MS message to the HLR 41. As this message passes through one of the STPs 42 in the network, this message can be used for deleting an entry in the allocation table 131. The message contains the IMSI of the mobile terminal 162 switched off. As IMSI is unique in only one entry, the correct entry in the allocation table 131 can be found and deleted. In cases like putting your SIM card in a new purchased mobile, the new allocation will be sent by the MSC 40 and there will not be sent a MAP_PURGE_MS as the same IMSI is in use. In the other cases like replacing a SIM card by another using the same mobile terminal will lead in time to a MAP_PURGE_MS as here another IMSI is used. In the meantime a new valid coupling already exists in the allocation table 131 based on the new IMSI so no match will be found. Also frequently changing SIM is no problem as the MSC 40 will discard the outstanding MAP_PURGE_MS when the corresponding SIM is used again.

As an option, the MAP-CANCEL-LOCATION message can be used to indicate that a mobile terminal is currently not reachable. To support this, an additional field in each entry may be implemented to indicates this. When a MAP-CANCEL-LOCATION is received and the VMSC address corresponds with the address in the entry then the field can be set to not reachable. If the VMSC address does not correspond then another VMSC will most likely already have issued a MAP-LOCATION-UPDATE before the MAP-CANCEL-LOCATION is issued. To safeguard that a not reachable indication keeps hanging, with every MAP-LOCATION-UPDATE the field is reset.

The present invention has been explained above with reference to a number of exemplary embodiments. As will be apparent to the person skilled in the art, various modifications and amendments can be made without departing from the scope of the present invention, as defined in the appended claims.

Explanation of the Abbreviations:
GMSC Gateway MSC
GSM Global System for Mobile communications
GUI Graphical User Interface
HLR Home Location register
IMEI International Mobile Equipment Identity
IMSI International Mobile Subscriber Identity
MAP Mobile Application Part
MAP-ATI MAP Any Time Interrogation
MSC Mobile Switching centre
MSISDN Mobile Station Integrated Services Digital Network
MT Mobile terminal
SCF Service Control Function
SCP Service Control Point
SEP Service End Point
SS7 Signalling System 7
STP Service Transfer Point
TSP Telecom Service Platform
UMTS Universal Mobile Telecommunications System
VLR Visited Location Register
VMSC Visited MSC

The invention claimed is:

1. A method for sending an emergency message in a mobile telecommunication network to mobile terminals located in an emergency area, the mobile terminals connected to at least one Visited Mobile Switching center (VMSC), said VMSC comprising a Visited Location register, said method comprising the steps of:
   storing location information and subscriber identification codes in a database for a plurality of mobile terminals, the location information and subscriber identification codes obtained from Mobile Application Part (MAP) messages sent by the VMSC to a Home Location Register (HLR) or obtained from MAP responses received by the VMSC from the HLR;
   deleting an entry in the database based on a purge MAP message indicating a switched off state of a corresponding one of the mobile terminals;
   determining said emergency area;
   selecting a set of destination terminals out of said database having location information that corresponds to said emergency area; and
   sending each of said destination terminals said emergency message.

2. The method according to claim 1, wherein said sending of said emergency message comprises sending said emergency message by means of a Short Message Service (SMS) message or a voice message using said subscriber identification code.

3. The method according to claim 1, wherein said constantly updated location information is stored in said database whenever one of the following events occurs:
   a call setup by a mobile terminal out of said plurality of mobile terminals,
   sending or receiving a SMS message with said mobile terminal;
   switching on or off said mobile terminal; and
   a periodic location update.

4. The method according to claim 1, wherein said storing of at least constantly updated location information and said subscriber identification code in said database and said sending of said emergency message is performed by means of multiple mobile telecommunication networks.

5. The method according to claim 1, said method comprising:
   receiving a MAP_NOTE_MM_EVENT message from a VLR of a mobile telecommunication network, by a network Service Control Point (SCP); and
   storing constantly updated location information and a subscriber identification code contained in said MAP_NOTE_MM_EVENT message in said database, by said SCP.

6. The method according to claim 1, said method further comprising:
   routing a MAP_LOCATION_UPDATE message from the VMSC, by a Signal Transfer point (STP), in an SS7 network; and
   storing a copy of constantly updated location information and a subscriber identification code contained in said MAP LOCATION_UPDATE message in said database, by said STP.

7. The method according to claim 6, wherein said database is a distributed database stored on several STPs of an SS7 network.

8. The method according to any of the preceding claims, wherein said subscriber identification code comprises a Mobile Station Integrated Services Digital Network (MSISDN), code, said method further comprising:

using said MSISDN for sending said emergency message to each of said destination terminals.

9. The method according to claim 1, wherein said subscriber identification code comprises an International Mobile Subscriber Identity (IMSI) code of a Global System for Mobile communications (GSM) or Universal Mobile Telecommunications System (UMTS) mobile terminal.

10. The method according to claim 9, wherein said emergency message is written or spoken in a language based on a country code comprised in said IMSI code.

11. The method according to claim 1, wherein said constantly updated location information comprises a CellID corresponding to a coverage area of a radio base station to which said mobile terminal is connected.

12. The method according to claim 11, wherein said selecting of a set of destination terminals from said database comprises:
   selecting each mobile terminal that has a CellID associated with a coverage area at least partially overlapping with said emergency area;
   requesting a dedicated position of the selected mobile terminals by means of an active location request using a MAP-ATI message; and
   determining said set of destination terminals based on the location information received from said terminals.

13. The method according to claim 1, wherein said emergency message is sent by means of a class 0 SMS message.

14. A mobile telecommunication network, arranged for sending an emergency message to mobile terminals located in an emergency area, said mobile telecommunication network having:
   a first network element arranged to:
   store at least location information and a subscriber identification code in a database, for a plurality of mobile terminals, obtained from Mobile Application Part (MAP) messages sent by a Visited Mobile Switching Center (VMSC) to a Home Location Register (HLR) or obtained from MAP responses received by said VMSC from the HLR; and
   delete an entry in the database based on a purge MAP message indicating a switched off state of a corresponding one of the mobile terminals;
   a second network element arranged for determining said emergency area; and
   a third network element arranged for selecting a set of destination terminals having location information that corresponds to said emergency area, and arranged for sending each of said destination terminals said emergency message.

15. The mobile telecommunication network according to claim 14, wherein said third fourth network element is arranged for sending said emergency message by means of a Short Message Service (SMS) message or a voice message using said subscriber identification code.

* * * * *